3 Sheets—Sheet 1.

E. BUSSEY.

COOKING-STOVE.

No. 6,785.

Reissued Dec. 7, 1875.

Witnesses:
H. A. Daniels
C. H. Isham

Inventor
Elek Bussey by
C. S. Whitman Atty

N. PETERS, PHOTO-LITHOGRAPHER, WASHINGTON, D. C.

3 Sheets—Sheet 2.

E. BUSSEY.

COOKING-STOVE.

No. 6,785. Reissued Dec. 7, 1875.

Witnesses:
H. A. Daniels
Chas. H. Isham

Esek Bussey, Inventor, by
Chas. S. Whitman Atty.

N. PETERS, PHOTO-LITHOGRAPHER, WASHINGTON, D. C.

3 Sheets—Sheet 3.

E. BUSSEY.

COOKING-STOVE.

No. 6,785.

Reissued Dec. 7, 1875.

Witnesses
Benjamin C. Pole
A. R. Parris

Inventor
Esek Bussey
by his Attorney
Chas. S. Whitman

N. PETERS, PHOTO-LITHOGRAPHER, WASHINGTON, D. C.

UNITED STATES PATENT OFFICE.

ESEK BUSSEY, OF TROY, NEW YORK, ASSIGNOR OF ONE-HALF INTEREST TO CHARLES A. McLEOD, OF SAME PLACE.

IMPROVEMENT IN COOKING-STOVES.

Specification forming part of Letters Patent No. 56,686, dated July 24, 1866; reissue No. 6,785, dated December 7, 1875; application filed July 8, 1873.

*To all whom it may concern:*

Be it known that I, ESEK BUSSEY, of Troy, in the county of Rensselaer and State of New York, have invented certain new and useful Improvements in Cooking-Stoves; and I do hereby declare that the following is a full, clear, and exact description thereof, that will enable others skilled in the art to which it appertains to make and use the same, reference being had to the accompanying drawings, and to the letters of reference marked thereon, which form a part of this specification.

The invention protected by these Letters Patent relates to that class of cooking-stoves which have a reservoir arranged behind the rear flues; and the nature thereof consists primarily in the employment and location of an intermediate plate in the rear of the exit-passage, and between the back oven-plate and the reservoir. It also consists in locating a reservoir heating-chamber between the oven and the reservoir without removing the exit-pipe from its usual position immediately in the rear of the oven and over the ascending flue. It also consists in placing a reservoir heating-chamber behind the ordinary rear flues of the stove, in such a manner that the hot gases passing down the side flues will expand into said chamber. It also consists in placing a reservoir heating-chamber between the reservoir and ascending flue, and in the rear of the exit-pipe, in such a manner that the heated gases passing up the ascending flue will expand into said chamber. It also consists in providing said intermediate plate with openings, whereby a communication is established between the reservoir heating-chamber and the rear vertical flues of the stove. It also consists in dividing the reservoir-chamber into compartments by extending the flue-strips of the rear vertical flues back of and beyond the intermediate plate, into said reservoir heating-chamber, and between said intermediate plate and the front of the reservoir.

Figure 1:
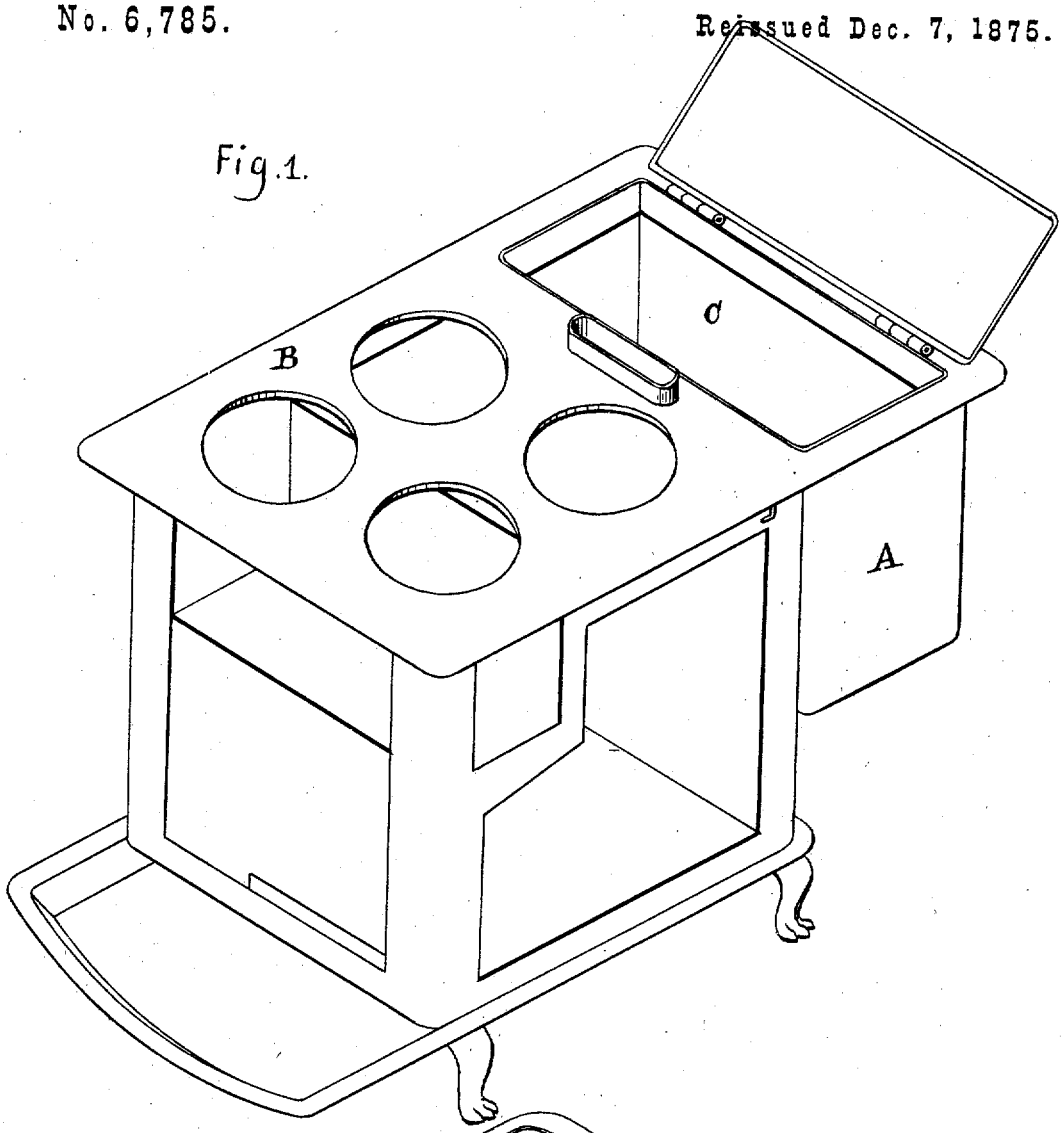
Figure 3:
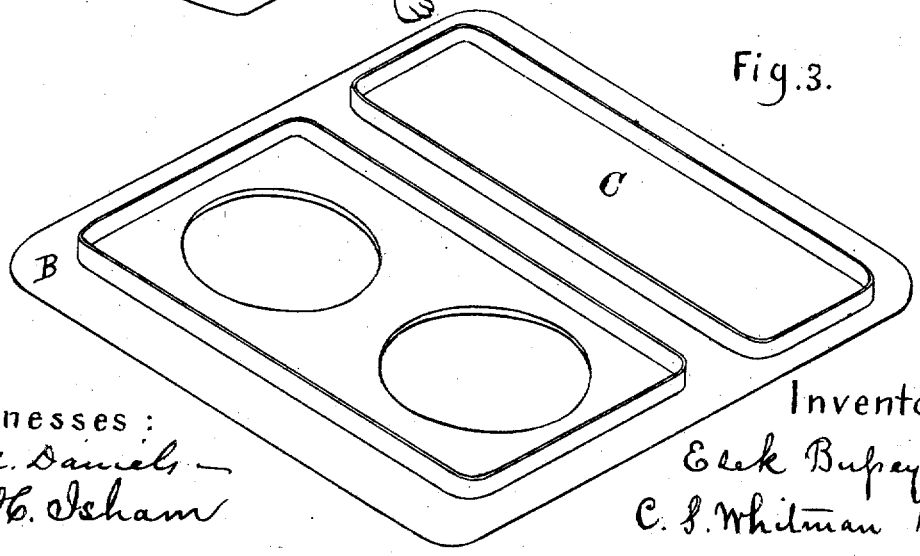
Figure 2:
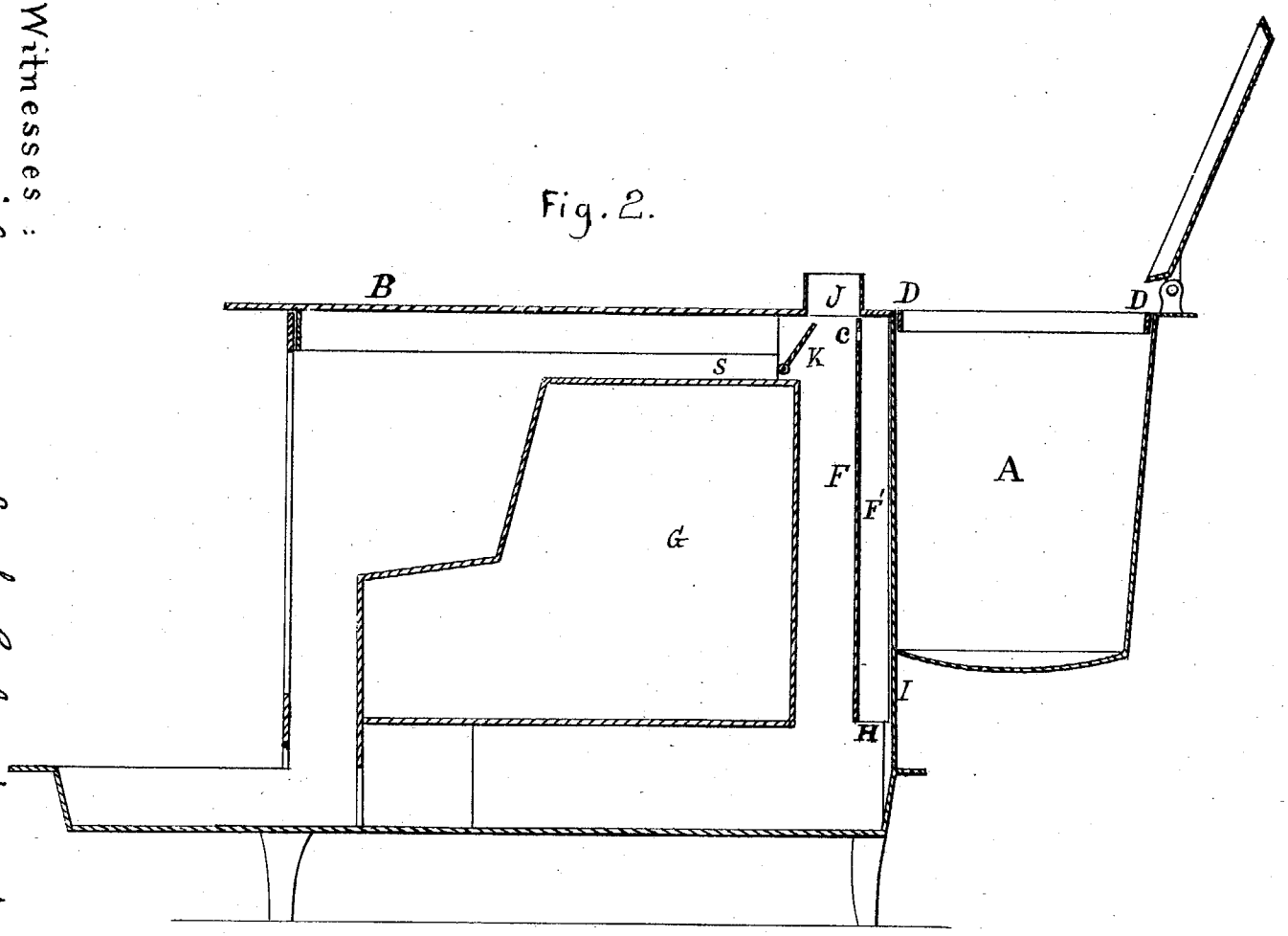
Figure 4:
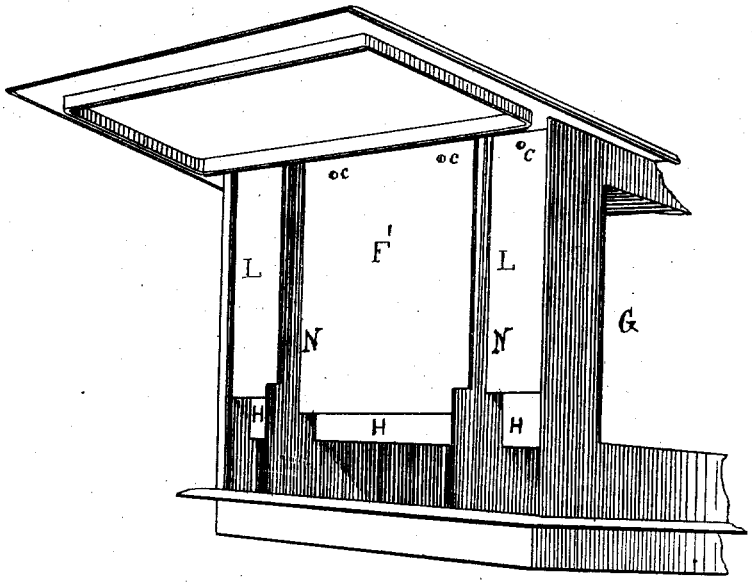
Figure 5:
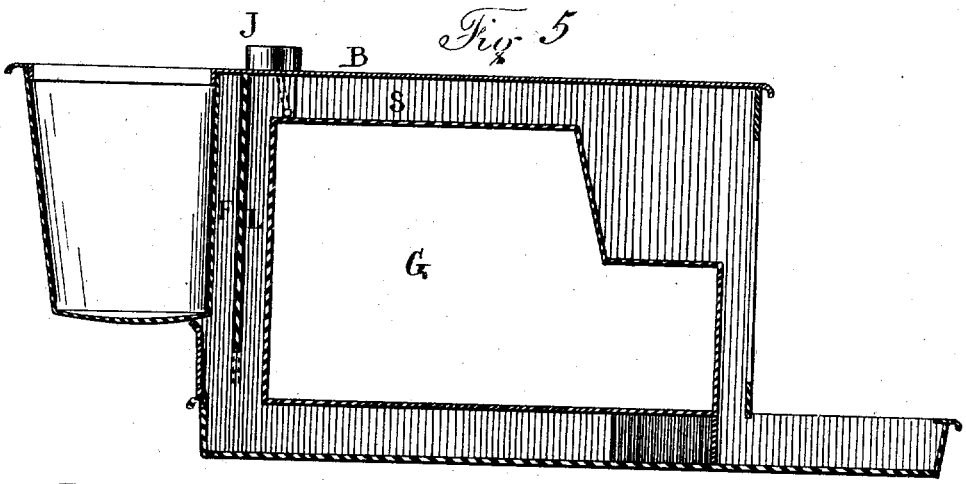

In the accompanying plate of drawings, in which corresponding parts are designated by the same letters, Figure 1 is a perspective view of a cooking-stove provided with a reservoir attachment, located behind the ordinary rear flue-space of the stove. Fig. 2 is a vertical longitudinal section through the ascending flue of the stove. Fig. 3 illustrates the top plate of the stove. Fig. 4 is a perspective view of the rear part of the stove, with the reservoir removed in order to clearly illustrate the hot-air chamber and flue-strip. Fig. 5 is a vertical longitudinal section through the ascending flue of the stove.

The various parts ordinarily found in a diving-flue stove, arranged with reference to each other in the usual way, are designated by the letters B S G K L J—that is to say, B is the top plate of the stove. S is the top flue above the oven. G is the oven. K is the damper, which, when open, allows the heat to pass directly to the exit-pipe, and when closed causes the heated products of combustion to flow down the side flues. L is a side descending flue. J is the exit-pipe. To the rear of stove, composed of these old and well-known elements, which have long been in successful use, I attach the reservoir A; but, as the mode of attaching said reservoir forms no part of the present invention, it needs no particular description. The reservoir rests against the plate I, which performs the twofold function of supporting the reservoir and constituting the back of the lower part of the reservoir-chamber F′, which extends beneath and up the front side of the reservoir. Between the reservoir and oven, and at any distance from the reservoir which may be deemed desirable, is placed the intermediate plate F. This intermediate plate constitutes the capital feature of the present invention; and it is confidently asserted that these Letters Patent afford the first example of an intermediate plate so located in the rear of the exit-pipe as to perform the twofold office of the ordinary back plate of a diving-flue stove and front plate of a reservoir heating-chamber.

The advantages which accrue from the use of the intermediate plate are as follows: First, when the direct draft is used, the products of combustion, on their way to the exit-pipe, radiate an intense heat upon that part of the reservoir which is least qualified to bear its effects—*i. e.*, the front wall of the reservoir above the water-level. By the use of the intermediate plate this part of the reservoir is thoroughly protected. Second, when the return-draft is used—or, in other words, the heated currents flow down the side flues, under the oven, and back through the ascending flue to the exit-pipe—the use of the intermediate plate prevents the gases from being so suddenly cooled as they would be if the front plate of the reservoir formed the rear casing of the flues. Third, by locating the intermediate plate as described a reservoir heating-chamber is formed without changing the exit-pipe from the position it usually occupies.

The size of the reservoir heating-chamber will depend upon the distance at which the intermediate plate is placed from the reservoir, and this, as hereinbefore stated, may be varied at pleasure without in any way affecting the principle of the invention.

The openings through which the heated gases expand into the reservoir heating-chamber are designated by letter H. The apertures *c* in the upper part of the intermediate plate, opening into the flue-space, are intended to produce a circulation of hot air along the front of the reservoir, and between it and the intermediate plate.

When the damper is open a direct draft is created, and the products of combustion pass at once to the exit-pipe without impinging or radiating intense heat upon the upper part of the front wall of the reservoir, as they would otherwise do if the intermediate plate were not placed in front thereof. When the damper is closed the heated currents pass down the side flues, under the oven, and back to the ascending flue, whence they reach the exit-pipe, expanding, in their progress through the openings H at the base of the intermediate plate, into the reservoir heating-chamber F′ in such a manner as to heat the reservoir without affecting detrimentally the baking qualities of the oven. In other words, the intermediate plate may be so adjusted that only that amount of caloric is extracted from the heated gases which is required to heat the reservoir.

The partition-strips N in the reservoir heating-chamber are so arranged behind the pipe-collar as to divide the said hot-air chamber into compartments, and also form a support, against which the reservoir rests.

I am aware that it is not new to incase a reservoir in a hot-air chamber, and that as long ago as A. D. 1829 a patent was granted purporting to cover that ground. I am also aware that a reservoir heating-chamber communicating with the central flue only of a three-flued stove, and having the exit-pipe in the rear of the reservoir, has been heretofore invented, but has been found objectionable, owing to the fact that the water in the reservoir is constantly kept at the boiling-point.

Having thus described the construction and operation of my invention, I will indicate in the following clauses what I claim and desire to secure by Letters Patent of the United States—that is to say:

1. In a stove in which the exit-pipe is allowed to remain in the usual position over the ascending flue, the combination of the following elements: first, the exit-pipe; second, the intermediate plate in front of the vertical heating-chamber; third, the reservoir, substantially as described.

2. The combination of the following elements: first, the exit-pipe placed over the ascending flue; second, the vertical reservoir heating-chamber in the rear of the exit-pipe; third, the reservoir, as and for the purpose described.

3. The combination of the following elements: first, the reservoir heating-chamber located in the rear of the exit-pipe; second, the apertures communicating between the lower part of the chamber and the rear flues; third, the rear flues, as described.

4. The combination of the following elements: first, the reservoir heating-chamber in the rear of the exit-pipe; second, the apertures communicating between the upper part of the heating-chamber and the flue-space behind the oven; third, the flue-space behind the oven.

5. The combination of the reservoir heating-chamber, located in the rear of the exit-pipe, and the downward flues of the stove, as described.

6. The partition-strips in the hot-air chamber, behind the pipe-collar.

7. A hot-air chamber between the intermediate plate and the front side of the reservoir, in combination with the flue-strips in said chamber.

8. The combination of the following elements: first, the hot-air chamber in the rear of the exit-pipe; second, the water-reservoir; third, the partition-strips between the intermediate plate and the reservoir; fourth, the openings communicating between the hot-air chamber and the rear space.

In testimony that I claim the foregoing I have hereunto set my hand.

ESEK BUSSEY.

Witnesses:

JNO. T. HOWELL,
EDW. O. EATON.